(12) United States Patent
Valentine

(10) Patent No.: US 9,137,144 B2
(45) Date of Patent: Sep. 15, 2015

(54) METHOD AND APPARATUS FOR COMMUNICATION PATH SELECTION

(71) Applicant: Alcatel Lucent, Boulogne Billancourt (FR)

(72) Inventor: Stephen G. Valentine, Camarillo, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 145 days.

(21) Appl. No.: 13/631,169

(22) Filed: Sep. 28, 2012

(65) Prior Publication Data

US 2014/0092910 A1    Apr. 3, 2014

(51) Int. Cl.
*H04L 12/733* (2013.01)
*H04L 12/721* (2013.01)
*H04L 12/707* (2013.01)
*H04L 12/803* (2013.01)

(52) U.S. Cl.
CPC .............. *H04L 45/122* (2013.01); *H04L 45/24* (2013.01); *H04L 45/66* (2013.01); *H04L 47/125* (2013.01)

(58) Field of Classification Search
CPC .... G08G 1/0104; G08G 1/0968; H04L 45/12; H04L 45/121; H04L 45/26; H04L 45/66; H04L 47/125
See application file for complete search history.

(56) References Cited

U.S. PATENT DOCUMENTS 6,400,681 B1 *   6/2002   Bertin et al. .................. 370/218
2009/0304007 A1 * 12/2009 Tanaka et al. ............ 370/395.53
2011/0063979 A1 *  3/2011  Matthews et al. .............. 370/237
2012/0039161 A1     2/2012  Allan et al.

FOREIGN PATENT DOCUMENTS

WO   PCT/US2013/061589    12/2013

OTHER PUBLICATIONS

Allan D et al: "Intelligent load balancing for shortest path bridging", IEEE Communications Magazine, IEEE Service Enter, Piscataway, US, vol. 50, No. 7, Jul. 1, 2012, pp. 163-167, XP011478272, ISSN: 0163-6804, D0I: 10.1109/MCOM.2012.6231293 the whole document.

* cited by examiner

*Primary Examiner* — Yong Zhou
(74) *Attorney, Agent, or Firm* — Chiesa Shahinian & Giantomasi

(57) ABSTRACT

A manner of selecting communication traffic paths through a LAN, WAN, or similar communication network. Traffic received at a source bridge is forwarded to a destination bridge along a communication path selected from a plurality of possible, preferably EHEC paths. The paths may be discovered by a breadth first search and stored in a path selection table in association with a sequential index number. The paths are selected, for example by assigning a path to a VLAN by determining V mod N, comparing the result to indices on a path selection table that associates an unique index with each of the plurality of communication paths, and selecting the path associated with an index equal to the result, wherein N is the number of paths in the plurality of paths and V is a group identifier. The selected paths may be stored in the path selection table in association with the respective VLAN, and any received traffic for that VLAN is forwarded along the selected path.

14 Claims, 4 Drawing Sheets

METHOD AND APPARATUS FOR COMMUNICATION PATH SELECTION

TECHNICAL FIELD

The present invention relates generally to the field of communication networks, and, more particularly, to a method and apparatus for maximizing the selection of communication paths such as EHEC (equal-hop, equal-cost) paths across a network from a source bridge to a destination bridge, especially in an SPB (shortest path bridging) operating environment.

BACKGROUND

The following abbreviations are herewith defined, at least some of which are referred to within the following description of the state-of-the-art and the present invention.
ECT Equal Cost Tree
EHEC Equal-Hop, Equal-Cost
IEEE Institute of Electrical and Electronics Engineers
I-SID service instance identifier
LAN Local Area Network
SPB Shortest Path Bridging
VID VLAN ID
VLAN Virtual Local Area Network
WAN Wide Area Network Communication networks such as LANs (local area networks) and WANs (wide area networks) frequently include a large number of interconnected devices. These devices may communicate with each other thorough the network so that, for example, client workstations such as PCs (personal computers) can communicate with each other or with servers in order to access information stored there or take advantage of their larger computing resources. Examples of such networks include those deployed by business enterprises or public or private institutions such as hospitals and universities.

In this type of communications environment, each network device is typically not connected directly to each other device, unless the network is very small. In most installations, such devices generally communicate with each other through a number, and sometimes a large number of nodes such as bridges, hubs, and switches. Because of the manner in which these devices are interconnected, communications through the network may be able to take any one of two or more paths. An efficient manner of directing communications to the appropriate recipient therefore becomes important.

STP (spanning tree protocol) and its numerous variants were developed to map out efficient paths through the network, and also to prevent loops where data traffic traversing the network may be forwarded to the same node more than once during the attempt to transmit it from a source to a destination. While it is advantageous to prevent loops and find the lowest cost paths available, STP will often block the use of some links between network devices as redundant. When the failure of a link or network occurs, the paths are recalculated and the redundant links may be utilized, but otherwise they represent an inefficient use of network resources.

More recently, SPB (shortest path bridging) as described primarily in the protocol IEEE 802.1aq uses a path mapping scheme that utilizes redundant paths by determining a number of EHEC (equal-cost, equal-hop) paths thought the network from a given source bridge to a particular destination bridge, and assigning each VLAN (virtual local area network) to one of one or more EHEC paths. A VLAN creates a broadcast domain for Ethernet traffic through the network by identifying certain intermediate bridges for use by the VLAN traffic. A VLAN may be associated with, for example, a particular department or customer. Loops are avoided because the data traffic always takes the specified path. At the same time, other VLANs may be assigned to otherwise redundant paths through the network.

IEEE 802.1aq specifies a number of ECT (equal cost tree) protocols in order to assign paths to individual VLANS. While these protocols do perform this function, they do in some situations fail to fully utilize all available paths when making these assignments. A manner of making path assignments that at least avoids these limitations and makes more robust use of network resources is therefore needed.

Note that the techniques or schemes described herein as existing or possible are presented as background for the present invention, but no admission is made thereby that these techniques and schemes were heretofore commercialized or known to others besides the inventors.

Accordingly, there has been and still is a need to address the aforementioned shortcomings and other shortcomings associated with selecting network communication paths for VLANs or other groups of data traffic. These needs and other needs are satisfied by the present invention.

SUMMARY

The present invention is directed at a manner of selecting communication traffic paths through a LAN or similar communication network. In one aspect, the present invention is a method of selecting for a communication group a communication path from a source node to a destination node through a network comprising a plurality of contiguous communication paths, the method including determining V mod N, comparing the result to indices on a path selection table that associates an unique index with each of the plurality of communication paths, and selecting the path associated with an index equal to the result, wherein N is the number of paths in the plurality of paths and V is a group identifier. In many implementations, the communication group is a VLAN, and the method may include assigning the assigning the identifier to the VLAN. In other implementations a group may includes more than one VLAN. Assigned VLAN identifiers are preferably sequentially assigned, and the VLAN identifier may be stored on a VLAN table. The method is performed by a processor of the source node and the table is stored on a memory device assessable by the processor.

In this aspect, the invention may further comprise ordering the paths by bridge identifier prior to associating the paths with indices in the path selection table and determining how many paths N exist between the source node and the destination node. In a preferred embodiment, the method also includes storing the selected path in the path selection table. The method may further include forwarding data traffic received at the source node toward the destination node along the selected path.

In another aspect, the present invention is a network node including a processor and a non-signal memory device, the memory device comprising program instructions that when executed enable determining V mod N, comparing the result to indices on a path selection table that associates an unique index with each of the plurality of communication paths, and selecting the path associated with an index equal to the result, wherein N is the number of paths in the plurality of paths and V is a group identifier. The node may also include a plurality of ports for network communication. In a preferred embodiment, the network node also includes a VLAN table for storing an identifier associated with one or more VLANs.

In another aspect, the present invention is a method of handling data traffic in a network, including receiving traffic at a source bridge, determining a destination bridge for the traffic, determining a VLAN associated with the traffic, checking a path selection table to determine whether the VLAN is associated with an EHEC path through the network. If it is, the traffic may be forwarded accordingly. If the VLAN is not associated with a communication path, the method further includes determining V mod N, comparing the result to indices on a path selection table that associates an unique index with each of the plurality of communication paths, and selecting the path associated with an index equal to the result, wherein N is the number of paths in the plurality of paths and V is a group identifier. The method may further include assigning a sequential ID number to the VLAN. According to this aspect, the invention preferably also includes forwarding the traffic along the selected path.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed at a manner of selecting communication traffic paths through a LAN (local area network), WAN (wide area network), or similar communication network. The present invention is particularly advantageous in large, highly meshed networks where existing SPB (shortest path bridging) protocols such as IEEE 802.1aq do not always distribute traffic as efficiently as possible. An illustration is provided with reference to FIG. 1.

Figure 1:
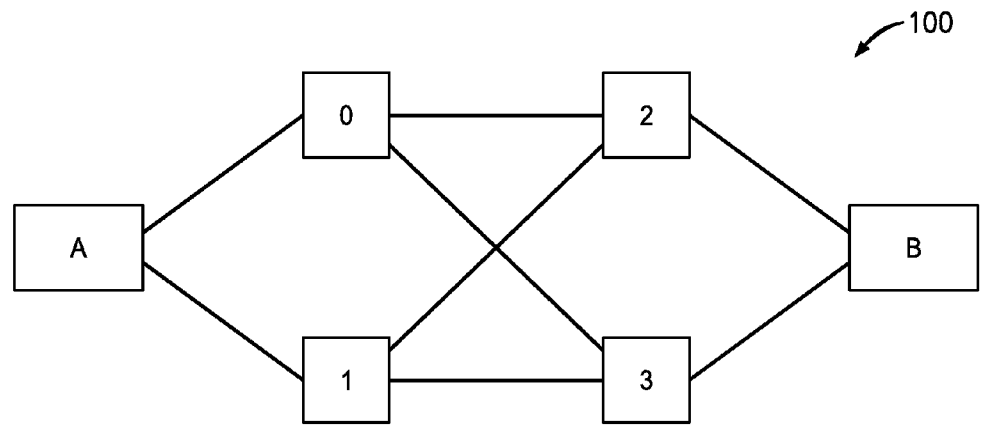
FIG. 1 is a simplified block diagram illustrating selected portions of a communication network in which an embodiment of the present invention may be advantageously employed.

FIG. 1 is a simplified block diagram illustrating selected portions of a communication network 100 in which an embodiment of the present invention may be advantageously employed. The nodes of network 100 are directly linked to one another as shown, for example using fiber optic cables. As an example, one port of node 0 is linked to node A, a second port to node 3, and a third port to node 2. Data traffic may pass from node A to node 2 via node 0 (or alternately, in this example, through node 1).

In the example of FIG. 1, nodes A and B may be considered source and destination bridges respectively. That is, they may be routers or some form of edge devices, perhaps linked to client devices or servers or to other networks or sub networks (not shown). The traffic presently being contemplated is received and at source bridge A and must be communicated to destination bridge B by one path or another. Note that the bridges represented in FIG. 1 may have other forms of ID numbers, but are here each referred to by a single character for simplicity of description.

As can be seen in FIG. 1, there are four paths from source bridge A to source bridge B available for data traffic that use the least number of hops. These paths may be labeled as 0:2, 0:3, 1:2, and 1:3, the labels deriving from the nodes that make up each path. These paths may be referred to as EHEC paths as each of the four includes two nodes between the source bridge and the destination bridge (the cost of each link is presumed to be equal, as is true in many networks in use today). Other paths are available, for example 0:3:1:2, but these are generally avoided when lower cost paths are available.

Of course, in an actual network, data traffic may also flow from bridge B to bridge A; a mapping analogous to that described herein is conducted for this traffic but need not be separately described. In that regard it may also be true that some of the other bridges may also function as a source bridge or destination bridge, and an analogous mapping may be done for them in that role as well.

Generally speaking, networks such as network 100 of FIG. 1 are not static; their configuration may be changed to suit current needs, to facilitate maintenance operations, or as the result of an equipment failure. As alluded to above, SPB as set forth in IEEE 802.1 aq provides for in initial topology discovery of the network 100 and determining the available paths. In the example of FIG. 1, however, the ECT (equal cost tree) protocols provided in IEEE 802.1aq may select only two paths; 0:2 and 1:3, while ignoring the other two. When this occurs, no traffic groupings (for example, VLANs) will be assigned to the paths 0:3 and 1:2. In more highly-meshed networks, only sixteen paths are calculated regardless of how many may be available. As mentioned above, the present invention provides an advantageous manner of addressing this and providing for a full selection of the available pathways between source bridge A and destination bridge B. An embodiment of the invention will now be described with reference to FIG. 2.

Figure 2:
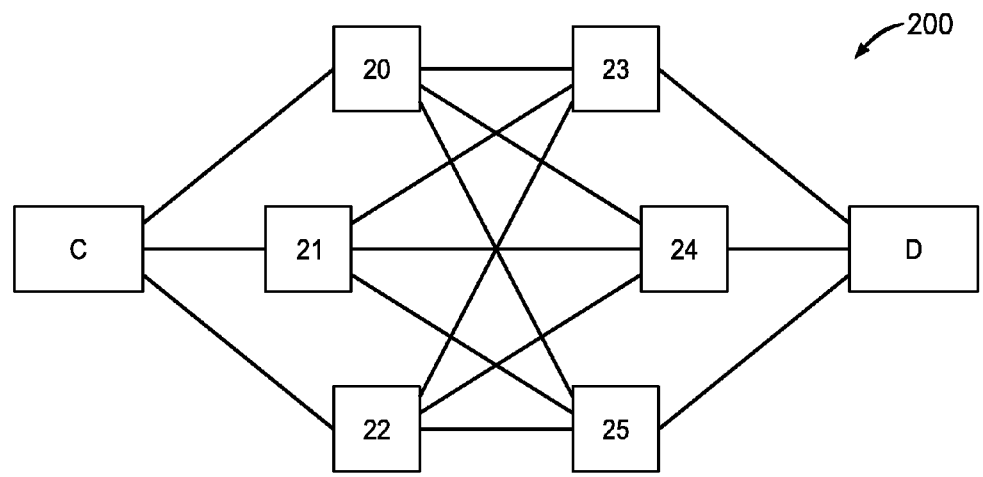
FIG. 2 is a simplified block diagram illustrating selected portions of a communication network in which an embodiment of the present invention may be advantageously employed.

FIG. 2 is a simplified block diagram illustrating selected portions of a communication network 200 in which an embodiment of the present invention may be advantageously employed. As should be apparent, network 200 is similar to network 100, but includes more nodes and links and is therefore considered more highly-meshed. Although referred to as a "network", network 200 may be simply a sub-network of a larger network. It will again be presumed that the cost assigned to each link is equal so that the primary path consideration is the number of hops from node to node. It is noted in this regard, however, that while this presumption is not considered unusual, it is not a requirement of the present invention unless explicitly set forth in a particular embodiment.

In the embodiment of FIG. 2, network 200 includes nodes C and D, which for purposes of this description are referred to as source bridge C and destination bridge D, acknowledging that they may have other roles in the network as well. As should be apparent, there are nine paths from source bridge C to destination bridge D presuming all nodes and links are operational. This is discoverable in a network, for example by source node C, during a breadth-first search and ECT algorithm such as is indicated in IEEE 802.1aq and related protocols. Note that according to the ECT algorithms, the paths selected are EHEC and are the lowest cost paths traversing the network. If any of the nodes depicted in FIG. 2 are not operational, the path discovery process determines this and the path selections are based on the then-existing topology. Changes to the network topology typically require that that path discovery and assignment be performed again.

In this embodiment, the nine paths available for selection stored in a path selection table (see FIG. 4) on source bridge C as represented by the table below. In this embodiment, in the path selection table the paths are stored in order by path number and form a well-ordered set as shown:

TABLE 1

| PATH SELECTION TABLE |
| --- |
| Path |
| 20:23 |
| 20:24 |
| 20:25 |
| 21:23 |
| 21:24 |
| 21:25 |
| 22:23 |
| 22:24 |
| 22:25 |

In accordance with this embodiment of the present invention, each path is then associated with an index that is also stored in the path selection table as represented below.

TABLE 2

| PATH SELECTION TABLE | |
| --- | --- |
| Index | Path |
| 0 | 20:23 |
| 1 | 20:24 |
| 2 | 20:25 |
| 3 | 21:23 |
| 4 | 21:24 |
| 5 | 21:25 |
| 6 | 22:23 |
| 7 | 22:24 |
| 8 | 22:25 |

According to the embodiment of FIG. 2, a path can now be selected for each VLAN. In this embodiment, twelve VLANs are assumed to require assignment and are each assigned a sequential ID number V, beginning in this case with 099. These identities are stored in a VLAN table in the source node C.

TABLE 3

| VLAN TABLE | |
| --- | --- |
| VLAN | V |
| VLAN1 | 099 |
| VLAN2 | 100 |
| VLAN3 | 101 |
| VLAN4 | 102 |
| VLAN5 | 103 |
| VLAN6 | 104 |
| VLAN7 | 105 |

TABLE 3-continued

| VLAN TABLE | |
| --- | --- |
| VLAN | V |
| VLAN8 | 106 |
| VLAN9 | 107 |
| VLAN10 | 108 |
| VLAN11 | 109 |
| VLAN12 | 110 |

Note that any convenient sequence number V may be used for the first VLAN (VLAN0). The VLANs do not all have to be identified initially; they can be added to the table and assigned a sequential ID number at a later time. In some implementations a sequential VLAN ID is already in use and a separate number need not be assigned. For convenience existing VLAN numbers may be truncated so long as each VLAN is uniquely (and preferably sequentially) identified.

According to this embodiment of FIG. 2, the path selection may now be accomplished using the algorithm V modulus N, where V is the sequential ID number for a given VLAN and N is the total number of available paths for selection. The VLAN selection is preferably stored in the path selection table.

TABLE 4

| PATH SELECTION TABLE | | | |
| --- | --- | --- | --- |
| Index | Path | VLAN | VLAN |
| 0 | 20:23 | VLAN1 | VLAN10 |
| 1 | 20:24 | VLAN2 | VLAN11 |
| 2 | 20:25 | VLAN3 | VLAN12 |
| 3 | 21:23 | VLAN4 | |
| 4 | 21:24 | VLAN5 | |
| 5 | 21:25 | VLAN6 | |
| 6 | 22:23 | VLAN7 | |
| 7 | 22:24 | VLAN8 | |
| 8 | 22:25 | VLAN9 | |

It is noted that in this embodiment more than one VLAN may use a selected path. As should be apparent, however, utilization of the present invention permits maximal path selection. A method according to the present invention will now be described.

Figure 3:
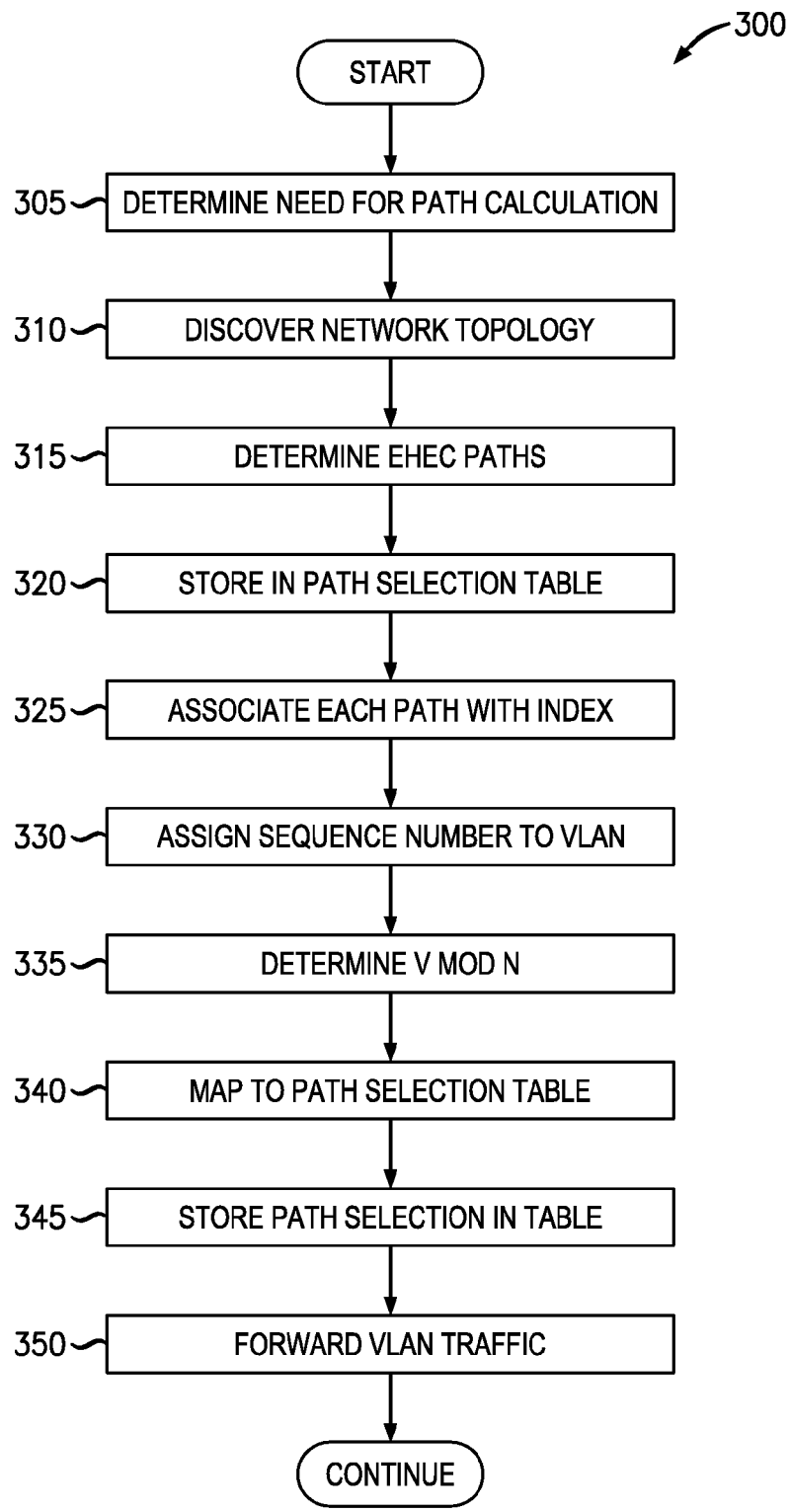
FIG. 3 is a flow diagram illustrating a method of selecting a communication path though a network according to an embodiment of the present invention.

FIG. 3 is a flow diagram illustrating a method 300 of selecting a communication path though a network according to an embodiment of the present invention. Note that while method 300 will be described largely from the perspective of a single source bridge (see, for example, node C shown in FIG. 2), the process may be replicated by a variety of network nodes. At START it is presumed that the components for performing the present invention are available and operational according to this embodiment. The process then begins when the need for network path calculation is determined (step 305). The need to recalculate the network may arise, for example, for a newly-installed network or change in configuration, or due to a failure of one or more links or nodes.

In this embodiment, when the need for network path recalculation is determined, the source bridge detects the neighbor node directly connected to each port and, preferably in a breadth-first search, the nodes reachable via a neighbor node via one or more hops (step 310). Once the network topology is discovered, each source bridge then determines the EHEC paths from the source bridge to a given destination bridge (step 315). In many cases the costs of each link are equal, so the path cost is determined by the number of hops forming the paths. In this case, according to the SPB protocol of IEEE 802.1aq, these EHEC paths represent the lowest number of hops from a source bridge to a given destination. Note that higher-cost paths may be identified as well, but these are in many cases not utilized. As exception may occur, for example, where only one lowest-cost path is identified; in that case it may be helpful to determine if there are a relatively-larger number of higher-cost paths.

In the embodiment of FIG. 3, once the EHEC paths are identified, this information is stored in a path selection table (step 320) and associated with an index number (step 325) (see TABLES 1-3, above). In a preferred embodiment, the EHEC paths entered in the path selection table are identified by a unique identifier and listed in order, forming a well-ordered list.

A single path may of course be selected for all traffic passing from the source bridge to the destination bridge; however this is neither usual nor preferred. In most implementations, respective groups of communication traffic will be assigned to different paths to spread the traffic load and use the network resources more efficiently. VLANs are one way of grouping traffic, where, for example, all traffic of a particular group such as an I-SID is associated with a particular VLAN and identified as such.

In accordance with the embodiment of FIG. 3, a path from the source node to the destination node is selected for each VLAN (or other identifiable communications group) in a manner that utilizes all of the existing paths (which, in this embodiment, are identified on the path selection table). In this embodiment, each identified VLAN is assigned a sequential ID (step 330), if it does not already have one. The VLAN and its associated ID number may be stored in a VLAN table in the source bridge (not separately shown).

In this embodiment, a path is then selected for any VLAN traffic received at the source bridge that is to be forwarded to the destination bridge. First, the operation V mod N is performed (step 335), where V=the sequential ID for the VLAN or other group, and N is the total number of available EHEC communication paths from the source bridge to the destination bridge. The result of this operation is then mapped to an index number in the path selection table (step 340). The VLAN ID is then stored in the path selection table (step 345) associated with the selected path. Any VLAN traffic received that is intended for the destination bridge is forwarded along the selected path (step 350) as reflected in the path selection table.

The process then continues with providing path selections for other VLANs or other communication groups traversing the network. Note however, that the process of path selection may be going on for several VLANs at the same time, and that it is not necessary to complete path selection for all VLANs prior to forwarding any traffic.

Figure 4:
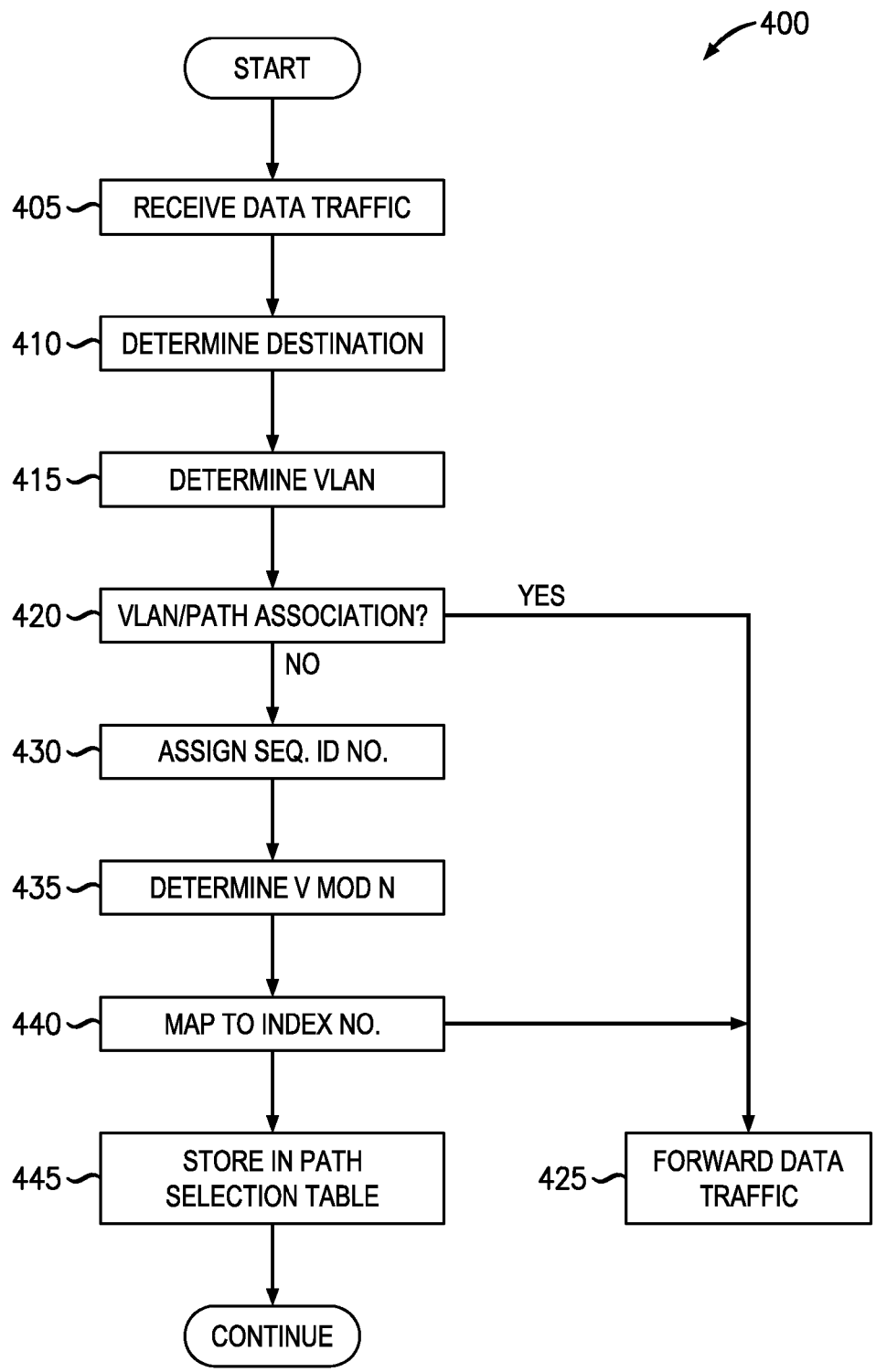
FIG. 4 is a flow diagram illustrating is a flow diagram illustrating a method according to another embodiment of the present invention.

FIG. 4 is a flow diagram illustrating is a flow diagram illustrating a method 400 according to another embodiment of the present invention. At START it is presumed that the components for performing the present invention are available and operational according to this embodiment. The process then begins when data traffic, for example a data frame, is received at a source bridge (step 405). The source bridge determines (step 410) the intended destination for the data traffic, and also identifies (step 415) the associated VLAN or other communication group. Note that here it is presumed the data traffic is in fact associated; if it is not, there may be procedure for assigning a VLAN or selecting a path for unassociated traffic (steps not shown).

In the embodiment of FIG. 4, the source bridge then determines (step 420) whether the VLAN is associated with a path stored in a path selection table of the source bridge. If so, that is if a data path was previously selected for the VLAN, then the data traffic is forwarded (step 425) along the path associated with the VLAN in the path selection table. If no path association appears, then the VLAN is assigned (step 430) a sequential ID number (if it does not have one) and stored in a VLAN table.

In this embodiment, a path is then selected for the data traffic received at the source bridge. Note that in this embodiment it is presumed that the network topology has been discovered and a path selection table for each destination bridge has been established in the source bridge. The operation V mod N is performed (step 435), where V is the sequential ID for the VLAN or other group, and N is the total number of available EHEC communication paths from the source bridge to the destination bridge in the appropriate path selection table. (The appropriate path selection table is the one associated with the destination bridge determined at step 410.) The result of this operation is then mapped to an index number in the path selection table (step 440). The received VLAN traffic is then forwarded along the selected path (step 425), that is, the one associated with the mapped index in the path selection table, toward the destination bridge. Preferably, the VLAN ID is then stored in the path selection table (step 445) associated with the selected path.

Note that the sequence of operation illustrated in FIGS. 3 and 4 represent exemplary embodiments; some variation is possible in other embodiments of the present invention. For example, additional operations may be added to those shown in FIGS. 3 and 4, and in some implementations one or more of the illustrated operations may be omitted. In addition, the operations of the method may be performed in any logically-consistent order unless a definite sequence is recited in a particular embodiment.

In an alternate embodiment (not shown), some or all of the sequences of FIGS. 3 and 4 may be combined such that VLAN/path associations are made and traffic is forwarded according to the associations. In this alternative, traffic for which no VLAN/path association exists when the traffic is received may simply be dropped.

Figure 5:
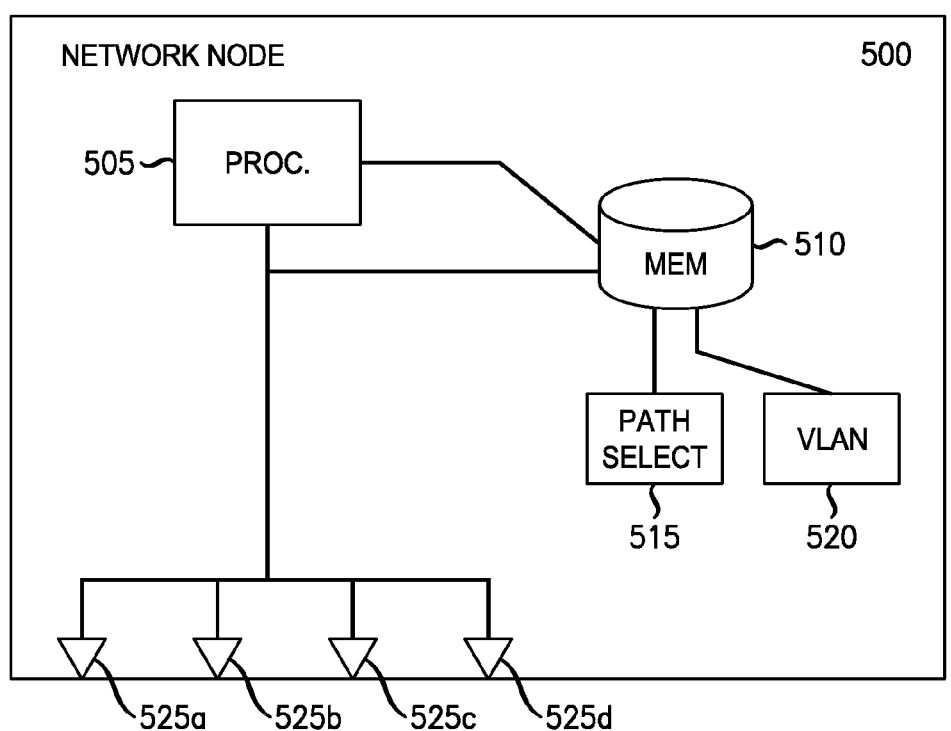
FIG. 5 is a simplified schematic diagram illustrating selected components of a network node according to an embodiment of the present invention.

FIG. 5 is a simplified schematic diagram illustrating selected components of a network node 500 according to an embodiment of the present invention. The network node 500 may, for example, act as a source bridge in accordance with the present invention. In accordance with this embodiment, network node 500 includes a processor 505 and memory device 510. Explicitly illustrated in conjunction with memory device 510 are path select table 515 and VLAN table 520, the functions of which are described above. Program instructions are stored on network node 500 to when executed perform at least the functions described herein. Although only a single path select and VLAN table are shown, additional tables may be formed as well. In some embodiments, a combined table may be used. Ports 525a through 525d are provided for connections with the network in which network node may be deployed or other connections.

In this embodiment, processor 505 is for controlling operation of the various other components of node 500, for example in accordance with program instructions stored on non-transitory memory device 510. The illustrated connection between processor 505 and the others components of node 500 is representative of the interconnection of these components but other configurations are possible. The components of node 500 are implemented in hardware or software executing on a hardware device, or a combination of both.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method of selecting, for a group of communication traffic, a communication path from a source node to a destination node through a network comprising a plurality of contiguous communication paths, the method comprising:
   determining lowest cost paths from the plurality of contiguous communication paths;
   determining V mod N,
   comparing a result of the determining to indices on a path selection table that associates a unique index with each of the plurality of communication paths, and
   selecting a path associated with an index equal to the result, wherein N is a number of the lowest cost paths in the plurality of communication paths and V is a group identifier corresponding to the group of communication traffic.

2. The method of claim 1, wherein the group of communication traffic is a VLAN.

3. The method of claim 2, further comprising assigning the identifier to the VLAN.

4. The method of claim 1, wherein the group of communication traffic comprises a plurality of VLANs.

5. The method of claim 1, wherein the method is performed by a processor of the source node and the table is stored on a memory device assessable by the processor.

6. The method of claim 1, further comprising ordering the paths by bridge identifier prior to associating the paths with indices in the path selection table.

7. The method of claim 1, further comprising determining how many paths N exist between the source node and the destination node.

8. The method of claim 1, further comprising storing the selected path in the path selection table.

9. The method of claim 1, wherein the plurality of contiguous communication paths are EHEC paths.

10. The method of claim 1, further comprising forwarding data traffic received at the source node toward the destination node along the selected path.

11. A network node, comprising a processor and a non-signal memory device, the memory device comprising program instructions that when executed enable:
   determining lowest cost paths from the plurality of contiguous communication paths;
   determining V mod N,
   comparing a result of the determining to indices on a path selection table that associates a unique index with each of a plurality of communication paths, and
   selecting a path associated with an index equal to the result, wherein N is a number of the lowest cost paths in the plurality of communication paths and V is a group identifier corresponding to a group of communication traffic.

12. The network node of claim 11, further comprising a plurality of ports for network communication.

13. The network node of claim 11, further comprising a VLAN table for storing an identifier associated with one or more VLANs.

14. A non-transitory computer readable medium storing computer program instructions, which, when executed on a processor, cause the processor to perform operations comprising:
   determining lowest cost paths from the plurality of contiguous communication paths;
   determining V mod N,
   comparing a result of the determining to indices on a path selection table that associates a unique index with each of a plurality of communication paths, and
   selecting a path associated with an index equal to the result, wherein N is a number of the lowest cost paths in the plurality of communication paths and V is a group identifier corresponding to a group of communication traffic.

* * * * *